Figure 1:
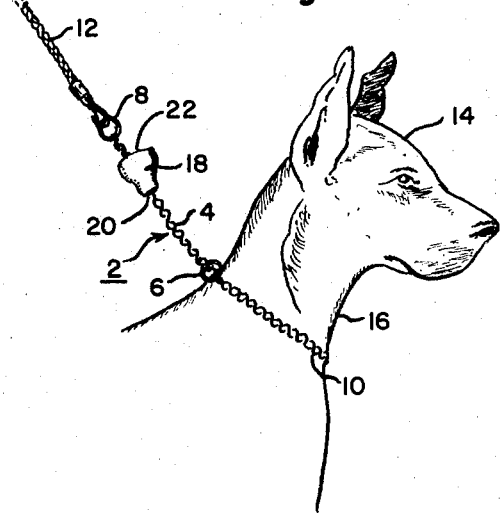

United States Patent
Kemmerling

[15] 3,701,339
[45] Oct. 31, 1972

[54] CHOKER-TYPE COLLAR

[72] Inventor: Arthur E. Kemmerling, 955 Ringgold Street, Pittsburgh, Pa. 15220

[22] Filed: May 18, 1971

[21] Appl. No.: 144,449

[52] U.S. Cl. .................... 119/106, 24/1, 24/115 H
[51] Int. Cl. .............................................. A01k 27/00
[58] Field of Search ....119/106, 118, 114; 54/24, 34; 24/115 G, 115 H, 123 H, 205.15 H; 294/74

[56] References Cited

UNITED STATES PATENTS

| | | | |
|---|---|---|---|
| 2,928,157 | 3/1960 | Deering | 24/205.15 H |
| 3,011,478 | 12/1961 | Kirby | 119/106 |
| 3,074,378 | 1/1963 | Clayton | 119/106 X |

*Primary Examiner*—Samuel Koren
*Assistant Examiner*—James H. Czerwonky
*Attorney*—Buell, Blenko & Ziesenheim

[57] ABSTRACT

A choker-type collar having a ring at each end of the collar with a sleeve guard member inserted along the collar between the two rings. The sleeve has an opening at each end of the sleeve to permit it to slide along the collar. One opening of the sleeve is smaller than the circumference of one of the rings to prevent the sleeve from slipping away from the collar. The other end of the sleeve is larger than the circumference of the ring to permit the sleeve to slide over the ring and cover it.

1 Claim, 3 Drawing Figures

PATENTED OCT 31 1972

3,701,339

INVENTOR
Arthur E. Kemmerling

CHOKER-TYPE COLLAR

This invention relates to a choker-type collar for dogs and other animals having a sleeve to cover one of the end rings of the choker-type collar to prevent the end ring engaging an object as the animal is running free from lead.

Most dogs including the hunting dog wear a choker-type collar which is a chain having two large end rings at each end through which a loop is formed and placed over and around the dog's neck. A leash is then linked to one of the large rings. As the dog moves and applies tension to the leash, the choker is pulled tighter around the dog's neck causing the dog to release the pulling force on the leash. This choker-type collar is used for training and for walking the animal. One of the problems with the choker-type collar is that when the leash is removed from one of the large end rings and the dog is allowed to run, the large ring can become entangled with a fixed object. If the dog is running at a fast pace and the open end ring catches on to a fixed object such as a nail in a fence, the dog will strangle itself by a sudden snap caused by the choker closing the loop around the dog's neck.

It is estimated that approximately 18,000 hunting dogs are strangled annually in trying to go through barbed wire fences. It is believed that there are also many pet dogs killed in the same manner.

The prior art has failed to solve this problem. The closest representative art is shown in U.S. Pat. No. 3,131,674 issued May 5, 1964 for a Safety Dog Collar. This patent shows a collar which releases upon the application of some excessive force thereby avoiding strangulation of the dog. The shortcoming, however, is that the collar is not the desired choker-type used in training and it is very complex in structure.

The present invention overcomes the safety hazzard in using a choker-type collar by providing a guard mechanism which can be slid along the collar chain and inserted over the end ring when the leash is removed from the end ring thereby covering the end ring and preventing it from becoming engaged with a fixed object as the dog runs. The device is simple in structure and economical to make.

Figure 2:
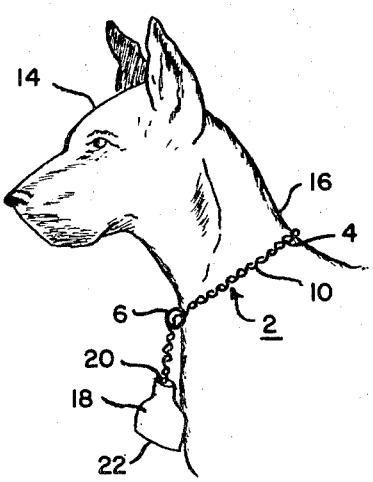
Figure 3:
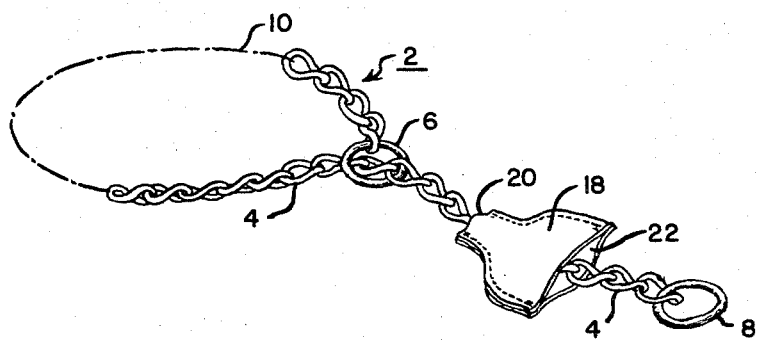

In the accompanying drawing I have shown a present preferred embodiment of the invention and have illustrated the method of practicing the invention wherein:

FIG. 1 is an isometric view of the choker-type chain engaging a dog's neck with a leash attached to the choker;

FIG. 2. is an isometric view of the choker with the sleeve covering the free end ring of the choker-type collar with the leash removed from the free end ring; and FIG. 3 is an isometric view showing a loop formed by the choker-type chain through which the dog would place its head and the sleeve slid back from the free end ring of the choker-type collar.

Referring to the figures, a choker-type collar 2 comprises a chain 4 with end rings 6 and 8 at each end of the chain. The chain 4 is pulled through ring 6 forming a large loop 10 through which the dog 14 can place its head. A leash 12 is attached to the ring 8 and as the dog 14 attempts to move from the leash 12, force is applied causing the loop 10 to constrict and thereby apply pressure around the dog's neck 16. When the leash 12 is removed to allow the dog 14 to run, ring 8 normally hangs free and can be subjected to engaging a fixed obstruction, such as a nail in a fence. If the dog 14 is running, the moment end ring 8 engages a fixed object, the dog 14 will snap its neck. To prevent end ring 8 from engaging any object, a sleeve 18 is slid along chain 4 and over the ring 8 covering it as shown in FIG. 2. The sleeve 18 has two openings 20 and 22. Opening 20 is restricted to a size smaller than the circumference of ring 8 to prevent the sleeve 18 from slipping away from the chain 4 and opening 22 has its size large enough to permit sleeve 18 to pass over the circumference of the ring 8 and cover it.

I claim:

1. A choker-type animal collar having an end ring at each end of the collar, the improvement comprising a sleeve guard member slidably positioned on the collar between the two rings, the sleeve having an opening at each end through which the collar can freely pass, one end of the sleeve having its opening restricted to a size smaller than the circumference of one of the rings to prevent the sleeve from slipping over it, the other end of the sleeve having its opening large enough to pass over and enclose the circumference of the same ring, said restricted sleeve opening being sized to provide a means for preventing the sleeve from slipping off the collar whereby the sleeve can be slipped along the collar to cover said one end ring.

* * * * *